No. 876,453. PATENTED JAN. 14, 1908.
W. H. HEARD.
SPRAY NOZZLE.
APPLICATION FILED FEB. 7, 1906.

WITNESSES:
INVENTOR.
W<sup>m</sup> H. Heard
BY Ridout & Maybee
ATTORNEYS

UNITED STATES PATENT OFFICE.

WILLIAM HENRY HEARD, OF LONDON, ONTARIO, CANADA.

SPRAY-NOZZLE.

No. 876,453.  Specification of Letters Patent.  Patented Jan. 14, 1908.

Application filed February 7, 1906. Serial No. 299,944.

*To all whom it may concern:*

Be it known that I, WILLIAM H. HEARD, of the city of London, in the county of Middlesex and Province of Ontario, Canada, have invented certain new and useful Improvements in Spray-Nozzles, of which the following is a specification.

The object of my invention is to devise means whereby an operator can spray substantially one half of the surface of a large tree without changing his position, and it consists essentially in connecting a cluster of spray nozzles to the end of a fluid conduit bent at an obtuse angle to the main part of the conduit, the spray nozzles being directed forwardly, but at an angle to the main part of the conduit, substantially as hereinafter more specifically described and then definitely claimed.

Figures 1, 2:
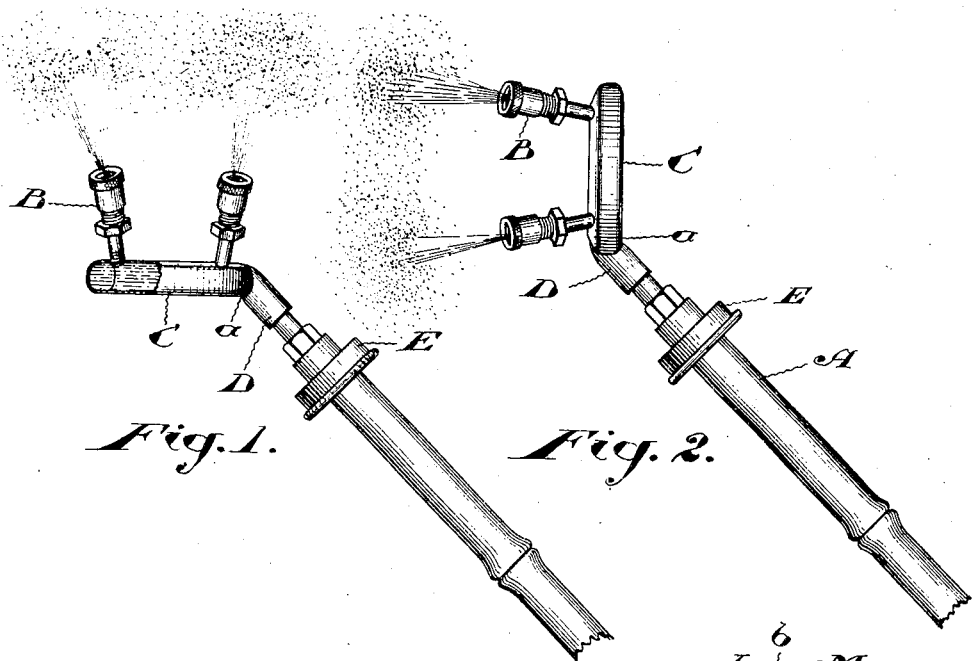
Figure 3:
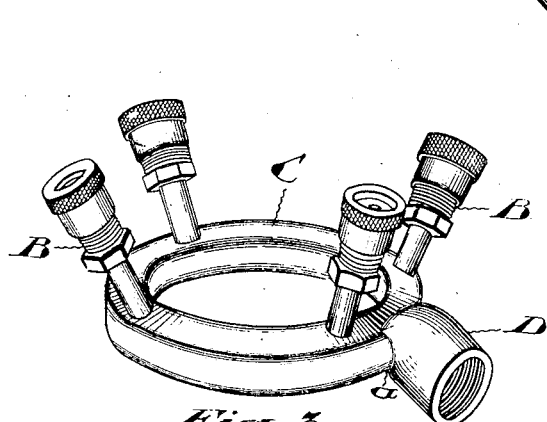
Figure 4:
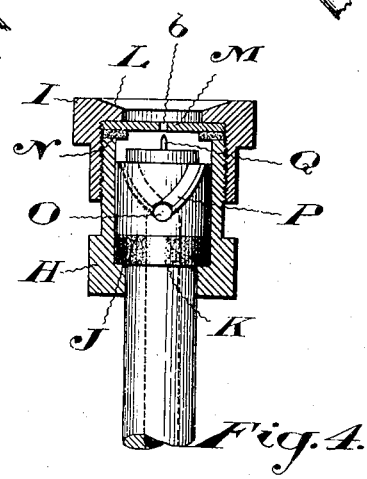
Figure 5:
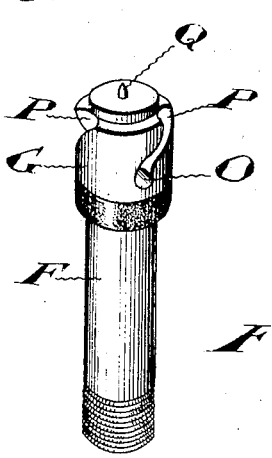

Figure 1 is a side elevation showing a nozzle cluster, with the spray directed upwardly. Fig. 2 is a similar view showing the lance turned through 180° and the spray directed laterally. Fig. 3 is an enlarged perspective view of the nozzle cluster. Fig. 4 is a vertical sectional elevation on a still larger scale, of a single nozzle. Fig. 5 is a perspective view on the same scale, of a nozzle with the cap removed.

In the drawings like letters of reference indicate corresponding parts in the different figures.

In its fundamental form my invention comprises a fluid conduit which may comprise a pipe A and a chamber C connected thereto at an obtuse angle at the point a, one or more spray nozzles B being connected with the chamber forming the end of the conduit, and adapted to discharge, in a forward direction, but at an angle to the main part of the conduit.

It is preferable that the spray nozzles be arranged to deliver their spray in a direction substantially at right angles to the forward surface of the end of the conduit, except for the fact that to spread the spray to the best advantage when a plurality of nozzles are employed, the nozzles are slightly inclined away from one another, producing a spray cloud of greater diameter than if the nozzles were parallel to one another.

In practice I find it preferable to have the chamber forming the end of the conduit at an angle of 135° to the main part of the conduit, as with this angle I find the most effective work can be done. For instance, supposing one side of the exposed surface of a tree is to be sprayed, the operator may, without changing the inclination of the part of the conduit he holds in his hands, discharge the spray upwardly against the under side of the surface of the tree, laterally against either side, or directly against the nearest part of its surface, while with the parts in the position shown in Fig. 2, the spray is easily dropped onto the top of the tree. Thus an operator, without changing his position, with a comparatively small movement of the conduit, may spray one-half the surface of a large tree, and with high pressure, and the employment of numerous nozzles in the cluster, moderate sized trees may be completely sprayed on one side while the apparatus is being drawn past them.

The arrangement of the apparatus I prefer is substantially that shown in the drawings, the bent end of the conduit being formed by the chamber C, preferably annular in shape, and provided with a socket D at an obtuse angle thereto, preferably 135°. This socket is connected with the pipe A, which is preferably the ordinary extension rod or lance employed with spray nozzles, and which is provided with a drip cap E.

The upper surface of the chamber C is preferably shaped as a frustum of a cone, and a series of spray nozzles are set equidistant from one another around the chamber, each having its axis normal to the surface from which it extends. Owing to the outward inclination thus given to each spray nozzle, the united spray is given as large a diameter as is possible, and of even quality throughout, as the separate spray from each nozzle interferes as little as possible with the spray from its neighbors.

F is the supply pipe of the nozzle, its lower end being screw threaded, for connection with the chamber C, as shown in Figs. 1, 2 and 3. This supply pipe has a closed, enlarged end G formed thereon. Inclosing the end of the pipe is a casing formed in two parts, H and I, screwed together. The lower part H has a shoulder or collar J formed thereon, adapted to fit beneath the shoulder formed by the enlarged end G. Between the two shoulders, a washer K is placed. The upper part I has a central opening therein, round which is formed a shoulder L, between which and the upper end of the lower part H of the casing is placed a disk M, and a washer N. In the center of the disk M is formed a spray opening b. Through the end G is formed a hole O, communicating with the inner bore of the supply pipe F. In the sides of the end communicating with the ends of the hole O are formed helical grooves P extending out through the top of the enlarged end. The extreme end of the part G is preferably reduced in diameter. On the center of the end G is formed or secured the disgorging needle Q.

From the construction described, it follows that the nozzle may be disgorged at any time by merely pressing its end against any resisting object, the pressure of the fluid within it immediately restoring the casing to its normal position.

What I claim as my invention is:

1. In spraying apparatus a fluid conduit bent at an obtuse angle near its discharge end, and a plurality of spray nozzles connected with said end and adapted to discharge at varying angles approximating right angles to the axis of the bent end but all in a substantially forward direction and at an angle to lthe main part of the conduit, substantial.y as described.

2 In spraying apparatus a fluid conduit comprising a pipe and a chamber connected at one side with the end of said pipe and at an obtuse angle thereto, and a plurality of spray nozzles connected with the chamber at different parts of its forward surface and adapted to discharge in a substantially forward direction but at an angle to the conduit, substantially as described.

3. In spraying apparatus a fluid conduit comprising a pipe and an annular chamber connected at one side with the end of said pipe and at an obtuse angle thereto, and a plurality of spray nozzles connected with the chamber at different parts of its forward surface and adapted to discharge in a substantially forward direction but at an angle to the conduit, substantially as described.

4. In spraying apparatus a fluid conduit comprising a pipe and an annular chamber connected at one side with the end of said pipe and at an obtuse angle thereto, and a plurality of spray nozzles connected with the chamber at different parts of its forward surface and adapted to discharge at varying angles but all in a substantially forward direction and at an angle to the main part of the conduit, substantially as described.

5. In spraying apparatus a fluid conduit comprising a pipe and an annular chamber connected at one side with the end of said pipe and at an obtuse angle thereto, and a plurality of spray nozzles connected with the chamber at different parts of its surface and adapted to discharge at varying angles but all in a substantially forward direction and at an angle to the main part of the conduit, each spray nozzle comprising a part connected with the end and carrying a disgorging needle and a cap longitudinally movable on the said part and provided with a spray aperture opposite the disgorging needle, substantially as described.

London, Ont. Janry. 2d, 1906.

WILLIAM HENRY HEARD

In the presence of—
 HENRY S. CULVER,
 P. M. DUNHAM.